United States Patent Office 3,042,682
Patented July 3, 1962

3,042,682
PREPARATION OF PYRIDINE ALCOHOLS
Robert S. Aries, 77 South St., Stamford, Conn.
No Drawing. Filed Sept. 12, 1958, Ser. No. 760,573
5 Claims. (Cl. 260—297)

This invention relates to a novel method for the preparation of pyridine alcohols and their homologues. More particularly, the invention concerns a novel method for the preparation of monomethylol compounds of alkyl pyridines.

In accordance with the novel method of this invention there may be prepared in high yield and purity and with economies in time and raw material consumption, alcohols of alkylpyridines, such as, for example, those having a betahydroxyethyl group at the 2-, 4-, or 6-position of the pyridine nucleus. Examples of such alcohols are monomethylol-2-picoline, monomethylol-4-picoline, and 5-ethyl-2-hydroxyethylpyridine.

In general, a hydrogen atom attached to the alpha-carbon atom of alkyl-groups substituted at the 2-, 4-, or 6-position of the pyridine nucleus is active due to the activating presence of the nitrogen atom of the pyridine nucleus. Therefore, a substance with such a hydrogen atom, for example, alpha-picoline, condenses with aldehydes to yield alcohols. In general, such a hydrogen attached to the alpha-carbon atoms of alkyl-groups substituted at the 3- or 5-position of the pyridine nucleus is relatively or completely inactive.

As aldehydes which may be employed for that condensation, there are included both aliphatic and aromatic aldehydes. However, from the industrial standpoint, formaldehyde is the aldehyde of greatest importance in forming such alcohols, which when formaldehyde is used as the aldehyde, form the methylols. The reaction is particularly useful when the alkyl-pyridine to be thus reacted is a compound containing a methyl group in the 2-, 4-, or 6-position of the pyridine nucleus. It is not necessary that such a methyl group be the sole alkyl substituent, as dimethyl-pyridines, ethyl-methyl-pyridine and other pyridines containing alkyl substituents are reactive if there is at least one alkyl group in the 2-, 4-, or 6-position, and especially if the alkyl group in such 2-, 4-, or 6-position is a methyl group. If more than one alkyl group exists in the 2-, 4-, or 6-positions, all such alkyl groups will or may react with the formaldehyde.

The general reaction has been described in the literature, for example, by A. Ladenburg, Berichte, vol. 22, page 2583 (1889); W. Konigs and G. Happe, Berichte, vol. 34, page 1343 (1903); A. Lipp and J. Richard, Berichte, vol. 37, page 737 (1904); R. L. Frank and others, J.A.C.S., vol. 68, page 1368 (1946).

From these articles it can readily be seen that the total reaction is quite complicated. For the case of 2-picoline the reaction may be represented by the following sequence:

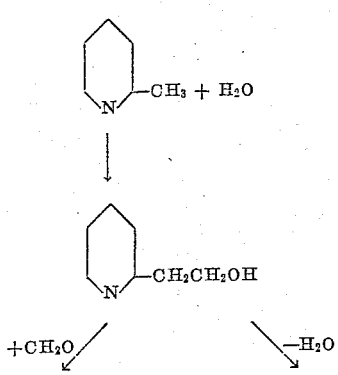

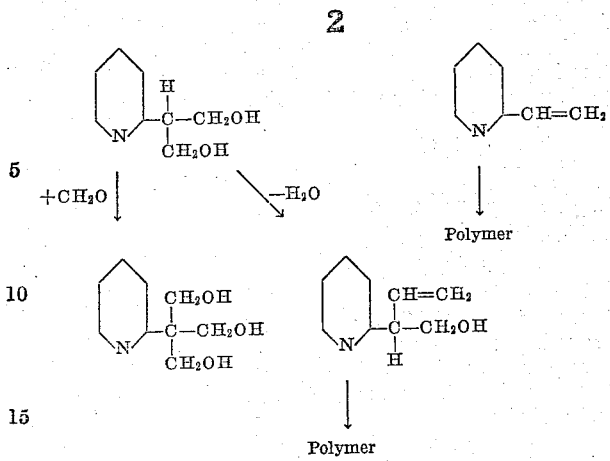

Similar sequences can be presented for the reactions of 4-methylpyridine, 5-ethyl-2-methylpyridine, and the like, with formaldehyde.

As a result of the reactions of addition of formaldehyde in stages, and loss of water to form vinyl type compounds which readily polymerize, the actual yield of the desired monomethylol compound is very low in the hitherto used processes.

One of the important uses of the monomethylol compounds is to prepare the corresponding vinylpyridines, but while the above scheme shows that vinylpyridine is a product resulting from the dehydration of the monomethylol-pyridine, the reaction is accompanied by further reaction of the monomethylol-pyridine, and the di- and tri-hydroxy-alkyl compounds of pyridine with additional formaldehyde to form higher methylols which may also, by dehydration in the course of the reaction, produce unsaturated alcohols, such as the vinyl-substituted pyridine alcohol as shown at lower right of the sequence, namely 2-(alpha-vinyl-beta-hydroxyethyl) picoline.

Various attempts have been made to convert, for example, the product derived from picoline directly to vinylpyridine, but the presence in the reaction product of picoline with formaldehyde of the complex mixture suggested in the graphical scheme shows why the results are disappointing as to yield even if a catalyst is used which attempts to direct the reaction toward the production of vinylpyridine. The essential condition for the production of a high yield of vinylpyridine is the direction of the reaction to the production of a high yield of pyridine-mono-methylol in the absence of by-products.

It is, therefore, the primary object of this invention to obtain high yields of the pyridine monomethylol compounds, such as 2-beta-hydroxyethyl pyridine and its isomers such as 4-beta-hydroxyethylpyridine and also its homologs such as 5-ethyl-2-beta-hydroxyethylpyridine, and the like. The corresponding vinylpyridines obtainable by the dehydration of the beta-hydroxyethyl derivatives can be obtained in practically quantitative yield from such beta-hydroxyethyl derivatives. However, the essential problem, not hitherto solved, has been to obtain high yields of the beta-hydroxyethyl derivatives. These intermediates are stable, easily stored compounds, whereas the corresponding vinyl derivatives are so reactive and polymerize so rapidly that they must be kept at low temperatures even in the presence of a polymerization inhibitor.

In accordance with one known method, for example, methylpyridines are treated with formaldehyde at high pressure at elevated temperatures in the presence of a catalyst, followed by rapid cooling of the reaction product, to obtain mixtures of the hydroxyethylpyridine and of the vinylethylpyridine, in which the vinyl compound may be present to the extent of 36%. In such mixtures the separation of the monomethylol derivative and the vinyl derivative presents problems because of the great tendency of the vinyl derivative to spontaneous polymerization.

In accordance with the present invention, it has been found, surprisingly and unexpectedly, that it is possible to obtain a monomethylolpyridine which is substantially free from vinylpyridines and hence from the detrimental tendency of the latter to polymerize spontaneously when present. Thus, the monomethylolpyridines obtained in accordance with the novel method of this invention are of high purity and stability, and can be shipped and stored for prolonged periods of time with no deterioration. The present process, moreover, eliminates the use of high pressures and of catalysts, thus resulting in further economies in time and materials.

In accordance with my novel method, the reaction between an alkylpyridine containing at least one methyl group in the 2-, 4-, or 6-position is carried out at elevated temperatures, while keeping the molar ratio of aldehyde to alkylpyridine below 1:1, and preferably as low as 0.5:1, and at ordinary pressure. Under these conditions, extraordinarily high yields of monomethylol pyridines are obtained, ranging from 93 to 99 percent, as indicated in accompanying Table 1, while the presence of vinylpyridines and high boiling impurities and by-products is held to a few percent. Moreover, no catalyst is required, and the only pressure present is that developed by heating in closed vessels used to reduce loss of aldehyde. Moreover, under the conditions employed in my novel process, some alkylpyridine necessarily remains unconverted, but is easily recovered for re-use by steam distillation.

When formaldehyde is employed, it may be used as a solution, for example, the commercial 37% solution in water, or as the anhydrous polymers, paraformaldehyde or trioxane. When the aqueous solution of formaldehyde is used, water is the solvent, but any other solvent may also be used, provided it does not react either with the reactants or with the products. A suitable solvent for example is a completely saturated hydrocarbon such as n-heptane or tetralin.

The temperature of the reaction is maintained between about 200° and 320° C., advantageously between about 210° and 300° C., and preferably between about 230° and 270° C. While the use of superatmospheric pressure is not required, in such cases where the use of pressure appears desirable, it may be employed up to about 150 atmospheres. The molar ratios of aldehyde to alkylpyridine are kept below 1:1, advantageously from about 0.2:1 to 0.8:1, and preferably between 0.35:1 and 0.65:1. The reaction time is very brief, generally less than 10 minutes, advantageously from 3 to 9 minutes, and preferably from 3 to 7 minutes.

Following the reaction, the reaction product is immediately cooled to below about 100° C., and the monomethylolpyridine is separated.

The preferred mode of carrying out the novel process of my invention is illustrated by the following examples, but the invention is not to be considered as limited thereto.

EXAMPLE 1

In a series of experiments, summarized in Table 1, 0.1 mole of the alkylpyridine was mixed with 0.05 mole of formaldehyde, either as the 37% aqueous solution or as paraformaldehyde, so as to contain 0.05 mole of actual $CH_2O$ or of its polymer.

The mixture, prewarmed to 100° C., was placed in a half liter stainless steel autoclave, the air was replaced by nitrogen, and the autoclave was closed and immersed in a large volume molten metal bath held at the desired temperature, and the charge in the reactor was subjected to the desired temperature for from 1 to 35 minutes, and the reactor was then lifted out and cooled as rapidly as possible. The cooled charge was then diluted with water, transferred to a distillation flask, and steam distilled to remove unconverted alkylpyridine and formaldehyde. The residue was then distilled at a pressure of 3 mm. of mercury at 97–100° C. to obtain the hydroxyethylpyridine as a distillate, while a residue of high-boiling material remained in the flask.

The residue of high boiling materials was weighed. The results of these experiments are set forth in the following Table 1:

*Table 1*

| Alkyl-Pyridine | Type of Formaldehyde | Temp., °C. | Time (min.) | Conversion, Mole Percent | | Mole Yield of Converted Pyridine | | |
|---|---|---|---|---|---|---|---|---|
| | | | | Pyr. | $CH_2O$ | Vinyl Pyr. | Mono-Methylol | High Boiling Compounds |
| 2-picoline | 37% solution | 210 | 15 | 20.3 | 87.3 | 0.3 | 94.8 | 4.9 |
| Do | do | 230 | 10 | 22.8 | 89.3 | 0.0 | 96.9 | 3.1 |
| Do | do | 250 | 5 | 25.5 | 96.7 | 0.0 | 99.0 | 1.0 |
| Do | do | 250 | 10 | 28.0 | 98.1 | 4.0 | 94.0 | 2.0 |
| Do | do | 280 | 3 | 27.7 | 98.7 | 2.5 | 96.0 | 1.5 |
| Do | do | 310 | 1 | 28.4 | 98.2 | 2.1 | 96.4 | 1.5 |
| 4-picoline | do | 240 | 5 | 20.7 | 94.8 | 0.9 | 97.5 | 1.6 |
| Do | do | 260 | 5 | 28.4 | 99.0 | 2.0 | 95.1 | 2.9 |
| 2-methyl-5-ethyl pyridine | do | 280 | 5 | 23.5 | 98.6 | 1.5 | 97.0 | 1.5 |
| Do | do | 280 | 10 | 27.3 | 99.3 | 4.1 | 93.1 | 2.8 |
| Do | do | 320 | 2 | 28.4 | 99.7 | 3.2 | 95.2 | 1.6 |
| 2-picoline | Paraformaldehyde | 310 | 1 | 27.1 | 93.2 | 3.3 | 94.2 | 2.5 |
| 4-picoline | do | 280 | 3 | 29.1 | 98.7 | 3.8 | 93.8 | 2.4 |
| 2-methyl-5-ethyl pyridine | do | 250 | 10 | 23.1 | 93.5 | 2.0 | 94.1 | 3.9 |

EXAMPLE 2

The reaction of Example 1 can be carried out in a continuous apparatus, such as is required on the commercial scale. The reaction was carried out on a considerably larger scale, using as raw material a mixture of 2-picoline and 37% aqueous formaldehyde, with the ratio of $CH_2O:C_5H_4NCH_3=0.5:1$. The mixture was fed by a positive displacement pump through a tubular preheater, heated by Dowtherm, where it acquired the desired temperature, to a high pressure reactor consisting of a jacketed stainless steel pipe with flanged ends. The jacket was heated by circulating Dowtherm to maintain the desired temperature. The charge was fed through a bottom inlet and discharged through a water cooled metal condenser to a metal receiver. The whole system was first flushed thoroughly with nitrogen and then pressured to 100 atmospheres with nitrogen supplied from a cylinder. The receiver was in its upper portion connected with a vent valve set at 110 atmospheres to release excess pressure. A slight flow of nitrogen from the pressure cylinder was maintained by means of a needle valve throughout the run to hold the pressure and to assure positive action of the vent valve. The residence time in the reactor when the feed was 32 grams per minute was 4.5 minutes. The products obtained in a 3 hour run under these conditions were diluted with an equal volume of water and then heated in a still to 100° C. to remove water and with it unchanged 2-picoline and formaldehyde. The residue was distilled under vacuum at 3 mm. of mercury absolute pressure and 97–100° C. to fractionate out the 2-hydroxyethylpyridine. From 4070 grams of 2-picoline, there were obtained 5820 grams of total reaction product. This reaction product yielded:

| | Grams |
|---|---|
| Recovered 2-picoline | 2940 |
| 2-vinylpyridine | 14 |
| Monomethylol-2-picoline | 1341 |
| 2-(alpha-hydroxymethyl)vinylpyridine | 7 |
| Dimethylol-2-picoline | 47 |
| Polymerized residue | 55 |
| Water and loss | 1416 |
| | 5820 |

Monomethylol-2-picoline was thus obtained in 89.6 molar percent yield. The 10.4% loss includes both the conversion to undesired compounds and also the unavoidable refining losses when operating on so limited a scale.

I claim:

1. Method for the preparation of monomethylol derivatives of alkylpyridines which comprises reacting an alkylpyridine selected from the group consisting of 2-picoline, 4-picoline, and 5-ethyl-2-methylpyridine with formaldehyde under a blanket of an inert gas at a pressure between about 1 and about 150 atmospheres, at a temperature between about 200° C. and about 320° C., for a period between about 3 and about 7 minutes, the molar ratio of formaldehyde to alkylpyridine being between 0.35:1 and 0.65:1, then rapidly cooling the reaction mixture to below 100° C., and recovering the monomethylol derivative therefrom.

2. The method of claim 1 in which the alkyl pyridine is 2-picoline.

3. The method of claim 1 in which the alkylpyridine is 4-picoline.

4. The method of claim 1 in which the alkylpyridine is 5-ethyl-2-methylpyridine.

5. Method for the preparation of monomethylol-2-picoline which comprises reacting formaldehyde with 2-picoline in a molar ratio of about 0.5:1, at a temperature between about 230° and about 270° C., at a pressure of about 100 atmospheres under a blanket of nitrogen gas, for a period of about 5 minutes, rapidly cooling the reaction mixture to below 100° C., and recovering monomethylol-2-picoline therefrom.

References Cited in the file of this patent

UNITED STATES PATENTS

| 2,512,660 | Mahan | June 27, 1950 |
| 2,698,848 | Mahan | Jan. 4, 1955 |
| 2,754,300 | MacLean et al. | July 10, 1956 |

OTHER REFERENCES

Profft: Chem. Abstracts, vol. 51, column 6629 (1957).